United States Patent Office 3,265,756
Patented August 9, 1966

3,265,756
PROCESS FOR MAKING ETHYLENE
Horst G. Langer, Cochituate, Mass., assignor to The Dow Chemical Company, Midland, Mich., a corporation of Delaware
No Drawing. Filed July 26, 1963, Ser. No. 297,973
3 Claims. (Cl. 260—677)

This invention relates to processes for producing ethylene by the decomposition of trivinyltin hydroxide.

Certain uses of ethylene require only small quantities of the gas but require a continuous supply over an extended period of time. Many biological uses require only trace amounts, as, for instance, the control of the ripening of stored fruit and the sprouting of potatoes. In such uses, the use of bottled gas is often inconvenient and may be unreliable because of the difficulty of metering the precise, minute amounts required to produce the desired effects.

It is an object of this invention to provide a method for producing ethylene at a low and controllable rate. Another object is to provide a method for establishing a low and controllable concentration of ethylene in a given enclosed space. Still another object is to provide a convenient source of ethylene from which the gas can be obtained as needed. Other objects will appear hereinafter.

According to the invention, ethylene is produced by the thermal decomposition of trivinyltin hydroxide, the products being ethylene and divinyltin oxide.

The rate at which ethylene is produced from trivinyltin hydroxide is related to the temperature. Thus, at 20° C. ethylene is slowly liberated over many months by a given sample of trivinyltin hydroxide while at 100° C. the decomposition is complete in less than one-half hour. It is thus evident that by suitable choice of temperature and/or quantity of trivinyltin hydroxide, the rate of production of ethylene can be very accurately controlled. Thus, for the production of laboratory quantities of ethylene, one merely places the requisite amount of trivinyltin hydroxide in a suitable generator, heats it gently and collects the evolved gas.

The process of the invention is particularly useful in producing and maintaining the very low concentrations of ethylene (of the order of parts per million) that are useful in such biological uses as controlling the growth of plants, the ripening of stored fruits and the sprouting of stored potatoes. In such applications, ethylene is generated in the greenhouse, storehouse, ship's hold or other enclosed space, by providing in such space an appropriate amount of trivenyltin hydroxide which is maintained at a temperature such as to provide the desired rate of evolution of ethylene. For example, in a storehouse for fruit or potatoes there is normally provision for circulation of air, and frequently the temperature of the air is controlled. In such cases, it is sufficient to provide in the stream of circulating air an amount of trivinyltin hydroxide sufficient to release ethylene at the ambient temperature at a rate that will maintain the desired concentration in the air being circulated.

I claim:
1. The process for producing ethylene comprising heating trivinyltin hydroxide at a temperature at which ethylene is evolved.
2. The process of claim 1 wherein the temperature is above normal room temperature.
3. The process for maintaining a substantially uniform low concentration of ethylene in an enclosed air space comprising maintaining in contact with the air in said space trivinyltin hydroxide in an amount and at a temperature such as to provide the said desired concentration of ethylene.

References Cited by the Examiner
UNITED STATES PATENTS

| | | | |
|---|---|---|---|
| 2,080,179 | 5/1937 | Merriam et al. | 99—225 |
| 2,892,856 | 6/1959 | Ramsden et al. | 260—429.7 |
| 2,962,522 | 11/1960 | Gibbons et al. | 260—429.7 |
| 3,198,819 | 8/1963 | Gloskey | 260—429.7 |

ALPHONSO D. SULLIVAN, *Primary Examiner.*